May 16, 1939.　　　　G. WÜNSCH　　　　2,158,737
CONTROL VALVE FOR LIQUIDS OF VARIABLE VISCOSITIES
Filed June 8, 1936　　　2 Sheets-Sheet 1
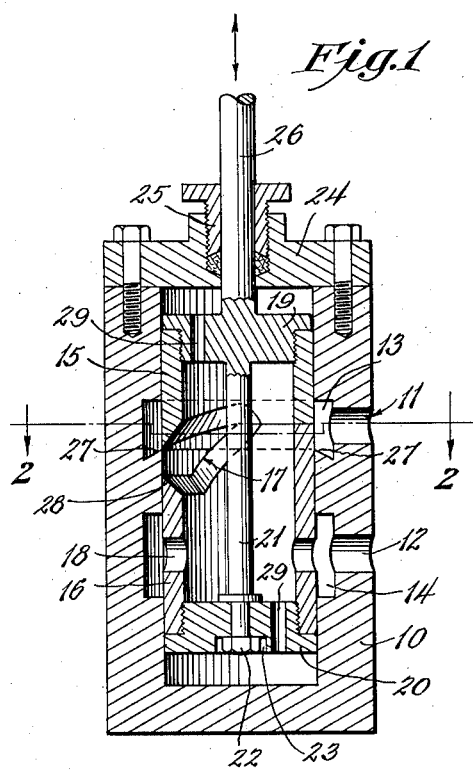
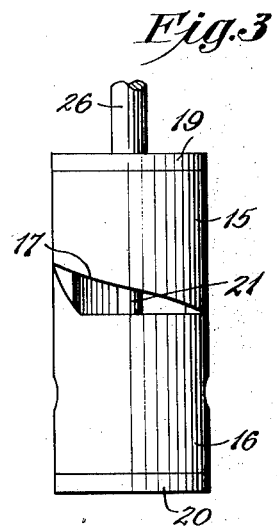
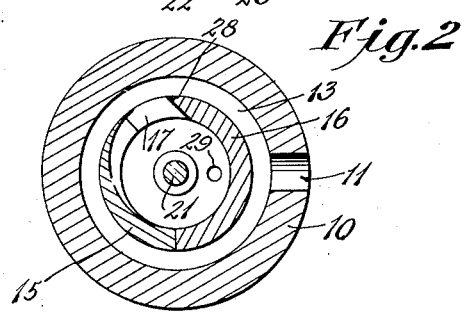
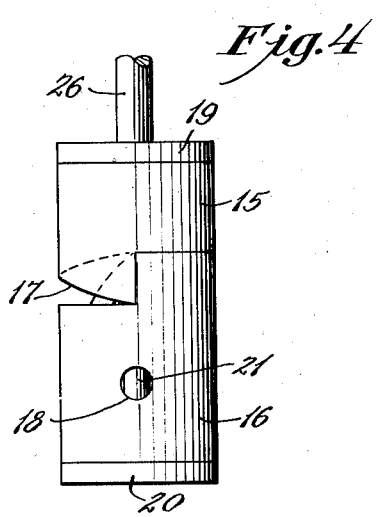
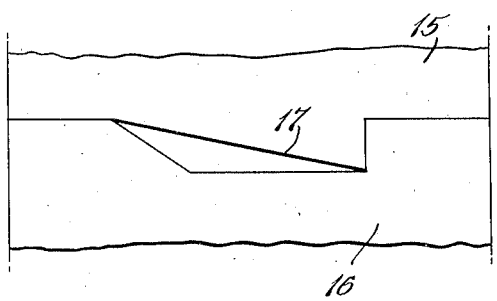
Inventor
Guido Wunsch
By A. D. Adams
Attorney May 16, 1939.  G. WÜNSCH  2,158,737
CONTROL VALVE FOR LIQUIDS OF VARIABLE VISCOSITIES
Filed June 8, 1936  2 Sheets-Sheet 2
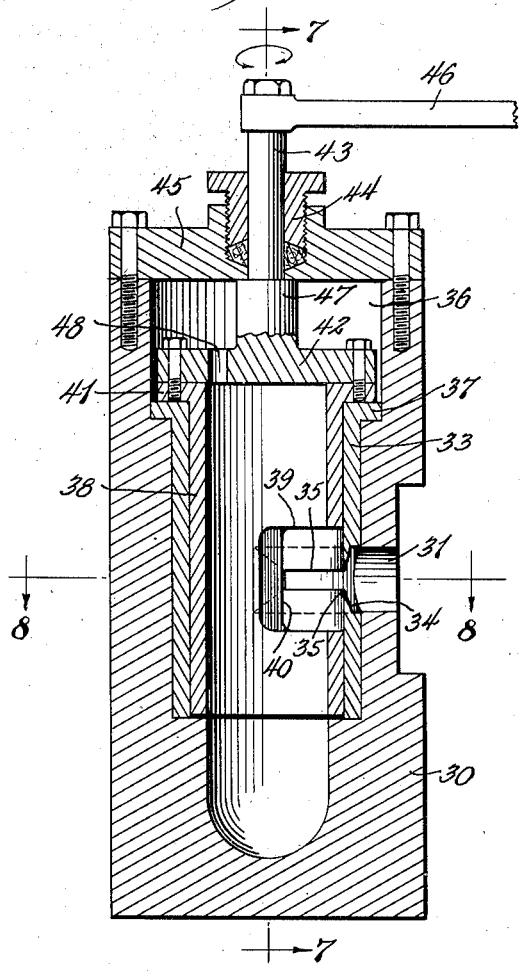
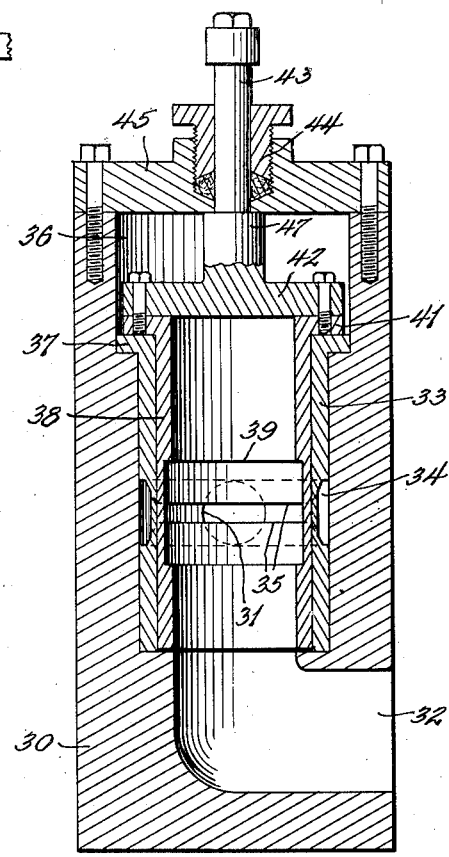
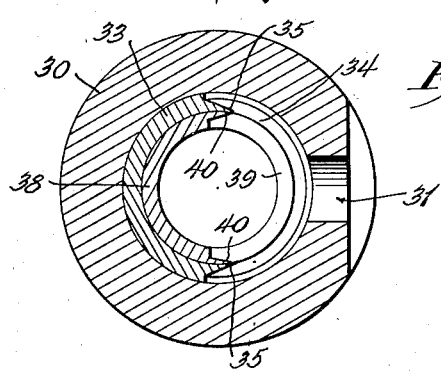
Inventor
Guido Wunsch
By A. D. Adams
Attorney Patented May 16, 1939

2,158,737

UNITED STATES PATENT OFFICE 2,158,737

CONTROL VALVE FOR LIQUIDS OF VARIABLE VISCOSITIES

Guido Wünsch, Berlin-Steglitz, Germany, assignor to Askania-Werke A. G., a company of Germany Application June 8, 1936, Serial No. 84,199
In Germany June 22, 1935

4 Claims. (Cl. 251—34)

This invention relates to control valves for liquids of various viscosities, such as liquid fuels, oils, tars, etc., and, among other objects, aims to provide greatly improved valves so constructed and arranged that the flow through them is not materially affected by changes in viscosity of the liquid. The main idea is to reduce changes in the rate of flow due to changes in viscosity.

Other aims and advantages of the invention will appear in the specification, when considered in connection with the accompanying drawings, wherein:

Fig. 1 is a vertical sectional view of a reciprocating valve having an opening or port which is a function of the valve stroke;

Fig. 2 is a section taken on the line 2—2 of Fig. 1;

Fig. 3 is an elevation of the valve member shown in Fig. 1;

Fig. 4 is another elevation of the valve member taken from the right hand side of Fig. 3;

Fig. 5 is a developed view of the valve port;

Fig. 6 is a vertical sectional view of a rotary type valve embodying the invention;

Fig. 7 is a sectional view taken on the line 7—7 of Fig. 6; and

Fig. 8 is a sectional view taken on the line 8—8 of Fig. 6.

It is a well known fact that friction losses of a liquid passing through valves are a function of the viscosity of the liquid. This invention, therefore, aims to reduce such friction losses to a minimum by providing very thin throttling edges for valves such as are used to control the supply of fuel oil and other liquids. In many cases, this is highly desirable, especially when it is necessary to maintain a practically constant flow coefficient through the valves in spite of viscosity changes.

While the invention may be embodied in various forms of valves, it is illustrated as being applied to special designs of reciprocating and rotary valves. In Fig. 1, it is embodied in a reciprocating valve of the hollow piston type adapted to be controlled by any form of automatic control mechanism or by hand. In this example, there is shown a substantially cylindrical valve casing or housing 10 having an inlet opening or conduit 11 and an outlet opening or conduit 12. The inlet conduit communicates with an annular channel 13 and the outlet conduit with an annular channel 14. The valve is in the form of a cylinder composed of two sections 15 and 16 having a triangular port 17 between their adjacent ends so designed that the opening is always a function of the valve stroke. The opening is designed to register with the inlet channel 13 and its vertical length is equal to or slightly less than the width of said channel; while the lower section of the cylinder has ports 18 registering with the wider outlet channel 14.

In this instance, both of the valve parts are held assembled by means of screw threaded closure plugs 19 and 20 and a central or axial stem 21, shown as being secured to the plug 19 and projecting through an opening in the plug 20. The plug 20 abuts a shoulder or flange on the stem 21 and a nut 22 is threaded on the lower end of the stem within a recess or counterbore 23 in the lower end of the plug.

The valve casing 10 is of sufficient length to permit the valve to be moved to fully closed and fully opened positions. It is shown as being closed at its upper end by a closure plate or head 24 carrying an ordinary stuffing box 25 through which an operating stem or rod 26 projects.

To reduce the friction losses of the liquid passing through the throttling opening 17, the annular channel 13 is shown as having a sharp lower edge 27 which may be in the form of a knife edge or a very thin wall and the edges of the triangular opening or port 17 are beveled to present sharp corners or edges 28 which are opposed to each other on the outer periphery of the cylinder parts and the upper port edge always coacts with the knife 27 in the channel when the valve is partially opened.

To permit the valve to move freely in the casing, the closure plugs 19 and 20 have openings 29 communicating with the opposite ends of the valve casing. This prevents air or liquid from being trapped in the opposite ends of the casing and helps to balance the valve.

In Figs. 6, 7 and 8, there is shown a rotary type cylinder valve having a casing 30 presenting an inlet conduit 31 and an outlet conduit 32. In this instance, the inside of the casing is lined with a valve sleeve 33 which is pressed into place. It has a substantially semi-circular slot 34 registering at its mid-portion with the port of the intake conduit 31 and the outer wall is cut away to reduce its thickness around this slot. The thin wall around the slot through the lining sleeve 33 is sharpened to present knife edges 35 defining the entire opening on the inside wall.

In this instance, the upper end of the valve casing is shown as having an enlarged counterbore 36 and the lining sleeve presents an annular flange 37 seated in the bottom of the counterbore. A cylindrical valve 38 is rotatably mounted in said lining sleeve 33 and is shown as having a substantially semi-circular, wide port 39 which is adapted to register with the slot 34. This port has thin vertical knife edges 40 at its opposite ends so that one of the knife edges will coact with the knife edges 35 of the slot 34 when the valve is turned in either direction. The metal is cut away on the inside of the cylinder to produce thin walls which are sharpened or beveled on the inside to produce the knife edges on the outer wall. The upper and lower edges of the slot are spaced from the intake opening 34 so that it is not necessary to provide sharp edges on them.

The lower end of the cylindrical valve 38 is open so that it communicates with the outlet duct or conduit 32. It is shown as having an annular flange 41 on its upper end to which is secured a cover plate 42 carrying a valve stem 43 extending through a stuffing box 44 in the casing head 45 and carrying a handle or operating arm 46. The cover plate has an integral boss 47 contacting the head 45 to prevent upward sliding movement of the valve. The cover 42 is shown as having an opening 48 which communicates with the upper portion of the counterbore 36 to permit oil or liquid to keep the counterbore filled and balance the valve.

It will be noted that in this form of valve, the valve orifice is always rectangular and its area is proportional to the angular movement of the valve. However, the ports can be of any desired shape to obtain this characteristic between the angular movement of the valve and the orifice area, as shown in the embodiment of Fig. 1. It is to be understood also that the valves may be embodied in many forms presenting sharp or thin edged orifices which determine by their relative position, the free area through which the fluid flows.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A control valve for fuel oil or other liquids of variable viscosities comprising, in combination, a substantially cylindrical casing having a knife-edged annular channel providing an inlet port; and a reciprocating cylindrical valve member composed of complemental parts providing a knife-edged triangular port between them to cooperate with said inlet port thereby presenting a variable knife-edged orifice which minimizes the effect of viscosity changes on the flow of the liquid.

2. A control valve for fuel oil or other liquids of variable viscosities comprising, in combination, a substantially cylindrical casing; a rotatable cylindrical valve member in the casing; and cooperating rectangular inlet ports in the casing and valve member having knife edges to provide an orifice arranged to be varied by varying its dimension in one direction only, so as to vary the flow in direct proportion to the opening and closing movement of the valve, said orifice being defined entirely by sharp edges to minimize the effect of viscosity changes on the flow of the liquid.

3. A control valve for fuel oil or other liquids of variable viscosities comprising, in combination, a substantially cylindrical casing having an inlet conduit; a cylindrical sleeve within the casing having a circumferential, rectangular knife-edged slot providing an inlet port; and a cylindrical valve member also having a rectangular port with knife edges to register with said inlet port and provide an orifice knife-edged on all sides, and arranged to be varied by varying its dimension in one direction only so as to produce a flow characteristic which is a function of the valve movement and minimizing the effect of changes in viscosity on the flow of the liquid.

4. In a valve, a casing, an inlet passage and a valve chamber in said casing, an inlet port in said chamber, an inlet chamber connecting said passage and port of greater extent than the port, said port being defined at least, in part, by knife edges, a hollow valve member in said valve chamber, an inlet port in said member registrable with the port in said valve chamber and communicating with the hollow interior of said member, said member being movable to vary the registration between said ports, the interior of said member being of greater extent than said inlet port, the inlet port in said member being defined at least, in part, by knife edges so related to the edges of the inlet port in the valve chamber that the opening formed by the communicating portions of said ports is completely enclosed by knife edges to minimize the effect of changes in viscosity on the flow of fluid.

GUIDO WÜNSCH.